Sept. 18, 1928.
C. A. NORGREN
1,684,713
HOSE CLAMP
Filed May 29, 1926
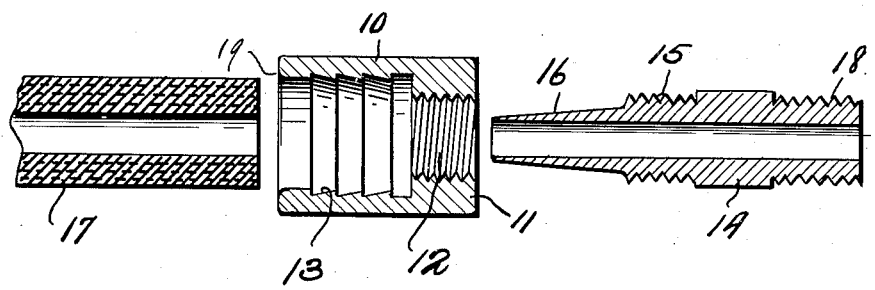
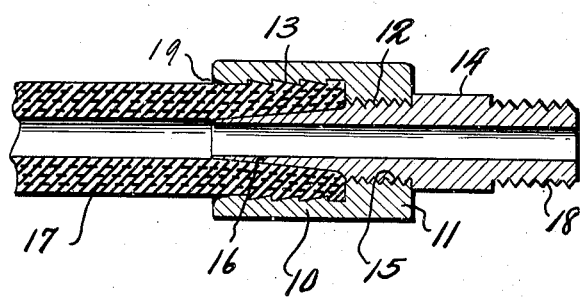
Inventor
C. A. Norgren
By Watson E. Coleman
Attorney Patented Sept. 18, 1928.

1,684,713

UNITED STATES PATENT OFFICE.

CARL A. NORGREN, OF DENVER, COLORADO.

HOSE CLAMP.

Application filed May 29, 1926. Serial No. 112,620.

This invention relates to hose clamps and particularly to clamps used for securing quick, efficient, and leak-proof connection for air or water hose.

The general object of the invention is to provide a device of this character whereby the usual inflating air chuck used for inflating tires may be connected with a flexible air hose and this connection made quickly, easily and effectively.

A further object is to provide a device of this character having very few parts and these of an extremely simple character.

My invention is illustrated in the accompanying drawings wherein:—

Figure 1 is a longitudinal sectional view of the hose clamp with the parts separated.;

Fig. 2 is a like view to Figure 1 but showing the parts assembled and Figure 3, an enlarged fragmentary sectional view of the clamp.

Referring to these drawings it will be seen that my device comprises a collar 10 which is hollow and open at one end, the other end being closed by a wall 11 having a central screw-threaded opening 12. The interior of the collar member provides a conical compression chamber between an entrance passage at one end of the member, and a shoulder 11 formed by the screw-threaded opposite end-portion of the same. The wall of the conical chamber is formed with a series of circumferential teeth of ratchet shape which slant so as to permit of the movement of a hose into the chamber through the entrance passage and which in the operation serve to admit the outer portion of the part of the hose compressed within the chamber as will hereinafter be described.

Coacting with the coupling 10 is the compression-member 14. This member at its middle is hexagonal in cross section to permit the application of a wrench thereto and then is formed with a portion 15 of uniform diameter and screw-threaded for engagement with the screw-threads 12. Forward of this portion 15 the member is tapered as at 16 so as to have wedging or compressive engagement with the extremity of a flexible hose 17. Outward of the hexagonal middle portion the member is screw-threaded as at 18 so that it may be engaged with any standard inflating air chuck or with any other connection as desired or necessary.

In the use of this device the air hose 17 is inserted in the collar 10 through the entrance passage of the coupling until the air hose strikes the shoulder 11. The entrance passage of the collar of the coupling has a diameter which is very slightly smaller than the diameter of the hose 17, but the extremity of the collar is beveled at 19 which permits the ready insertion of the hose. When the hose is properly inserted in the collar member 10 the compression member 14 is inserted until, the threads 15 engage the threads 12. The compression member is then turned to the position shown in Figure 2 and in doing so the tapered end portion of the compression member is forced into the hose expanding the same and forcing the hose outward until its outer portion enters the interdental spaces of the wall of the compression chamber, thereby securing a positive grip upon the hose which absolutely prevents the hose from pulling out. The tapered portion 16 of the compression member has a smooth, machined outer surface which forms a perfectly air tight seal with the interior of the hose. It will be seen that the tapered end-portion of the compression member extends through both the compression-chamber and the entrance-passage of the collar so as to engage the hose throughout the entire length of its portion within the collar.

The object of making the entrance passage smaller in diameter than the hose is to insure a tight fit and it will be obvious that when the compression member is screwed home after the hose has been inserted in the collar, the portions of the hose inside the compression space will be evenly and uniformly compressed throughout its length in the interdental spaces and that the compression of the hose will by reason of the elasticity of the material of which it is composed cause an even and uniform pressure upon the smooth surface of the conical portion of the compression member thereby insuring a constant air-tight joint.

It is to be understood that both the conical and serrated compression chamber, and the smooth faces compression member are essential features of the invention and that the coupling thus constructed is readily adapted for use in connecting conduits of flexible material with other conduits of either flexible or solid construction.

The device provides for quick and at the same time positive engagement between a nipple and a rubber hose and that while it may be used in a variety of circumstances it is particularly adapted for use with air hose and as a means for connecting the air hose to an inflating air chuck.

This hose clamp may be made with either male or female connections on the end of the nipple at 18 and may be used in any circumstance where air is used under pressure and for the purpose of joining a hose with a pipe or other device or joining one hose to another.

When the coupling is in place, the hole of the compression-member is substantially a continuation of the interior of the conduits connected by the coupling, thereby giving an unrestricted passage for the air and eliminate resistance which is present in all clamps in which the hose is contracted from the outside against some gripping medium or corrugated nipple on the inside of the hose. With my improved clamp the coupling will offer practically no resistance to the passage of air.

I claim:—

1. A coupling of the character described comprising a screw-threaded collar member having a hose receiving chamber and provided in the walls thereof with angular tapered grooves forming a series of annular ribs presenting front inclined faces and rear shoulders and adapted to grip and hold a hose, said chamber being provided at the front with a cylindrical wall in substantial alignment with the apexes of the annular ribs, an abutment shoulder at the inner end of the hose receiving chamber, and a compression-member screw-connected with the collar member and having a smooth faced tapering end portion arranged to be forced into the hose and cooperating with the said ribs of the compression chamber for compressing the hose within the said grooves.

2. A coupling of the character described comprising a screw-threaded collar member having a hose receiving chamber and provided in the walls thereof with angular tapered grooves forming a series of annular ribs presenting front inclined faces and rear shoulders and adapted to grip and hold a hose, said chamber being provided at the front with a cylindrical wall in substantial alignment with the apexes of the annular ribs, the hose receiving chamber being also provided at its inner end with an annular groove forming a smooth cylindrical surface of greater diameter than the cylindrical surface at the outer end of the hose receiving chamber, an abutment shoulder at the inner end of the hose receiving chamber, and a compression-member screw-connected with the collar member and having a smooth faced tapering end portion arranged to be forced into the hose and cooperating with the said ribs of the compression chamber for compressing the hose within the said grooves.

In testimony whereof I hereunto affix my signature.

CARL A. NORGREN.